(12) United States Patent
Arai

(10) Patent No.: US 12,737,968 B2
(45) Date of Patent: Sep. 15, 2026

(54) IMAGE PROCESSING SYSTEM, IMAGE PROCESSING METHOD, AND STORAGE MEDIA

(71) Applicant: CANON KABUSHIKI KAISHA, Tokyo (JP)

(72) Inventor: Tomoaki Arai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 18/462,159

(22) Filed: Sep. 6, 2023

(65) Prior Publication Data

US 2024/0104832 A1 Mar. 28, 2024

(30) Foreign Application Priority Data

Sep. 22, 2022 (JP) ................................ 2022-151518

(51) Int. Cl.

| | |
|---|---|
| ***G06T 15/20*** | (2011.01) |
| ***G06T 17/00*** | (2006.01) |
| ***G06V 10/94*** | (2022.01) |
| ***G06V 20/64*** | (2022.01) |

(52) U.S. Cl.

CPC ........... *G06T 15/205* (2013.01); *G06T 17/00* (2013.01); *G06V 10/945* (2022.01); *G06V 20/64* (2022.01); *G06T 2200/24* (2013.01); *G06V 2201/10* (2022.01)

(58) Field of Classification Search

None

See application file for complete search history.

(56) References Cited

U.S. PATENT DOCUMENTS

2014/0340404 A1* 11/2014 Wang .................. H04N 13/279 345/427
2022/0036644 A1 2/2022 Kobayashi
2022/0084282 A1 3/2022 Araki

FOREIGN PATENT DOCUMENTS

JP 2015045920 A 3/2015
JP 2022028091 A 2/2022

* cited by examiner

*Primary Examiner* — Peter Hoang

(74) *Attorney, Agent, or Firm* — Canon U.S.A., Inc. IP Division

(57) ABSTRACT

A management apparatus acquires a plurality of digital contents each including a virtual viewpoint image associated with one subject, and identifies a first digital content selected by a user, and a second digital content including a virtual viewpoint image, which includes a subject associated with a virtual viewpoint image of the first digital content in an imaging range. The management apparatus generates a display image including the first digital content and the second digital content.

17 Claims, 11 Drawing Sheets

500
511
512
513
514
515
516
503
501
502
521
DETERMINE
102

900
901
918
919
917
916
910
911
915
102
920
912
913
914

900
901
918
919
917
916
910
915
913
914
1001
1016
1015
1014
1013
1012
1011

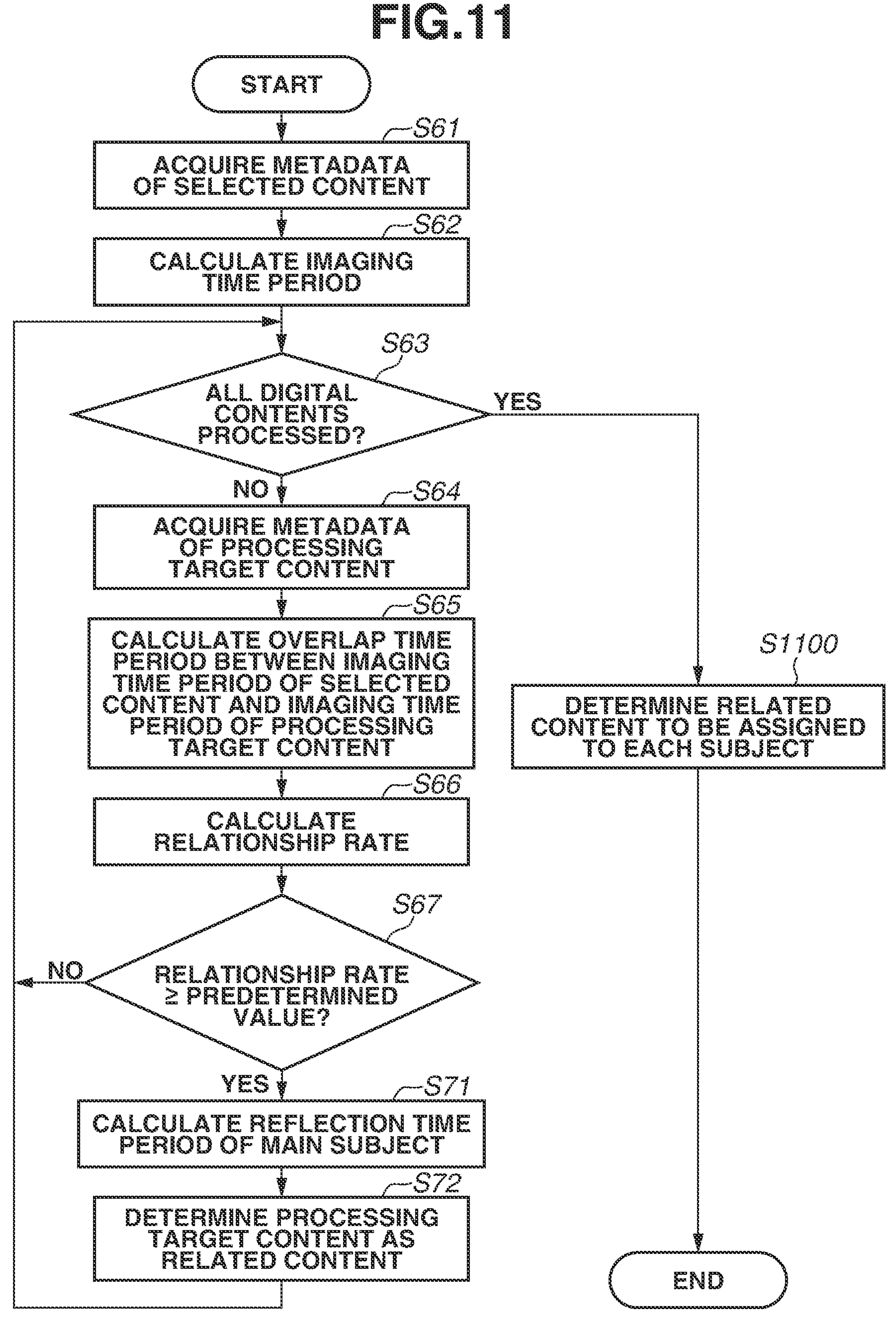
FIG.11
START
S61
ACQUIRE METADATA OF SELECTED CONTENT
S62
CALCULATE IMAGING TIME PERIOD
S63
ALL DIGITAL CONTENTS PROCESSED?
YES
NO
S64
ACQUIRE METADATA OF PROCESSING TARGET CONTENT
S65
CALCULATE OVERLAP TIME PERIOD BETWEEN IMAGING TIME PERIOD OF SELECTED CONTENT AND IMAGING TIME PERIOD OF PROCESSING TARGET CONTENT
S66
CALCULATE RELATIONSHIP RATE
S67
RELATIONSHIP RATE ≥ PREDETERMINED VALUE?
NO
YES
S71
CALCULATE REFLECTION TIME PERIOD OF MAIN SUBJECT
S72
DETERMINE PROCESSING TARGET CONTENT AS RELATED CONTENT
S1100
DETERMINE RELATED CONTENT TO BE ASSIGNED TO EACH SUBJECT
END

IMAGE PROCESSING SYSTEM, IMAGE PROCESSING METHOD, AND STORAGE MEDIA

BACKGROUND OF THE DISCLOSURE

Field of the Disclosure

The present disclosure relates to an image processing system, an image processing method, and a storage media.

Description of the Related Art

Digital contents created by processing video images obtained by imaging sports and the like have been traded.

For example, a video image obtained by clipping a scene, such as a dunk shot of a basketball player for about a few seconds, is traded as a digital content. As to the display form of a trade screen, there is an example in which a digital content is displayed in a three-dimensional shape, and a video image, additional information, and the like are displayed for each display surface of the three-dimensional shape. A user can purchase a digital content after confirming the video image by selecting a three-dimensional shape on the trade screen.

Meanwhile, a technology of generating a virtual viewpoint image has been attracting attention. The virtual viewpoint image is viewed from a designated virtual viewpoint, using a plurality of images obtained by imaging performed by a plurality of imaging apparatuses. It is conceivable that a digital content including a virtual viewpoint image is generated as one of the above-escribed digital contents. Japanese Patent Application Laid-Open No. 2015-45920 discusses a method in which a subject is imaged by a plurality of imaging apparatuses placed at different positions, and a virtual viewpoint image is generated using a three-dimensional shape of the subject, estimated from images obtained by the imaging.

A virtual viewpoint video image can be obtained by imaging from each of various viewpoints, and therefore, a plurality of digital contents can be generated for the same scene of a player. In addition, a digital content obtained by imaging a different player in the same scene can be generated. If a plurality of digital contents is thus generated for various scenes during a game, the total number of digital contents is expected to swell enormously in the end. Thus, this makes it difficult to identify a desired digital content from the plurality of digital contents on a trade screen.

The present disclosure is directed to providing a function of easily identifying a desired digital content from a plurality of digital contents each including a virtual viewpoint image.

SUMMARY OF THE DISCLOSURE

According to an aspect of the present disclosure, an image processing apparatus includes an acquisition unit configured to acquire a plurality of three-dimensional objects each including a virtual viewpoint image that is a virtual viewpoint image generated based on a plurality of images captured by a plurality of imaging apparatuses and is associated with one subject, a first identification unit configured to identify a first three-dimensional object based on a user operation, among the plurality of three-dimensional objects, a second identification unit configured to identify a second three-dimensional object including a virtual viewpoint image, which includes a subject associated with a virtual viewpoint image of the first three-dimensional object, in an imaging range of a virtual camera corresponding to a virtual viewpoint image, among the plurality of three-dimensional objects, and a generation unit configured to generate a display image including the first three-dimensional object and the second three-dimensional object.

Further features of the present disclosure will become apparent from the following description of exemplary embodiments with reference to the attached drawings.

BRIEF DESCRIPTION OF THE DRAWINGS

FIG. 11 is a flowchart illustrating a method of selecting a related content according to the third exemplary embodiment.

DESCRIPTION OF THE EMBODIMENTS

Figure 1:
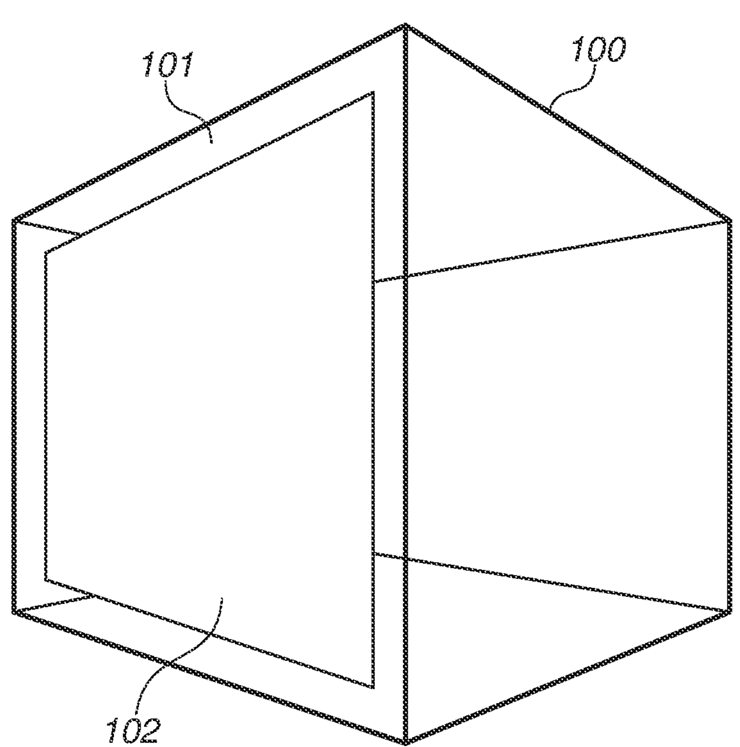
FIG. 1 is a diagram illustrating an example of a digital content.

Exemplary embodiments of the present disclosure will be described below with reference to the drawings. However, the present disclosure is not limited to the following exemplary embodiments. In each of the drawings, similar members or elements are denoted by identical reference numerals, and the description thereof will not be repeated or will be simplified.

An image processing system of a first exemplary embodiment acquires a plurality of digital contents each having a display surface that displays a virtual viewpoint image. The image processing system displays a digital content selected by a user and a digital content related to the selected digital content, on a trade screen.

The virtual viewpoint image is also referred to as a free-viewpoint image, and can be monitored as an image corresponding to a viewpoint freely (arbitrarily) designated by a user. Examples of the virtual viewpoint image include an image monitored as an image corresponding to a viewpoint selected by a user from among a limited plurality of viewpoint candidates. The virtual viewpoint can be designated by a user operation, or can be automatically designated by artificial intelligence (AI), based on an image analysis result or the like. The virtual viewpoint image can be a moving image or a still image. Virtual viewpoint information used to generate the virtual viewpoint image is information including the position and direction (orientation), and further, the angle of view (focal length), of a virtual viewpoint. Specifically, the virtual viewpoint information includes parameters representing a three-dimensional position of the virtual viewpoint, parameters representing a direction (line-of-sight direction) from the virtual viewpoint in pan, tilt, and roll directions, and focal length information. However, the content of the virtual viewpoint information is not limited to the above-described examples. For example, a parameter representing the field size (angle of view) of the virtual viewpoint can be included in a parameter set provided as the viewpoint information. The virtual viewpoint information can have a plurality of parameter sets. For example, the viewpoint information can be information that has a plurality of parameter sets corresponding to the respective plurality of frames forming a moving image as the virtual viewpoint image, and indicates the position and direction of a virtual viewpoint at each of a plurality of consecutive time points.

The virtual viewpoint information can also have parameters for each of a plurality of frames. In other words, the virtual viewpoint information can be information having parameters corresponding to each of a plurality of frames forming a moving image as the virtual viewpoint image, and indicating the position and direction of a virtual viewpoint at each of a plurality of consecutive time points.

For example, the virtual viewpoint image is generated by the following method. First, images are acquired by imaging performed from different directions by a plurality of cameras. Subsequently, a foreground image and a background image are acquired from the plurality of cameras. The foreground image is formed by extracting a foreground area corresponding to a subject, such as a human figure or a ball. The background image is formed by extracting a background area excluding the foreground area. The foreground image and the background image each have texture information (e.g., color information).

Subsequently, a foreground model representing a three-dimensional shape of the subject and texture data for coloring the foreground model are generated based on the foreground image. In addition, texture data for coloring a background model representing a three-dimensional shape of the background, such as a stadium, is generated based on the background image. Subsequently, the texture data is mapped to the foreground model and the background model, and rendering is performed based on the virtual viewpoint indicated by the virtual viewpoint information, so that the virtual viewpoint image is generated. However, the method of generating the virtual viewpoint image is not limited to this example. Various methods can be used, including a method of generating a virtual viewpoint image by using a projective transformation of a captured image without using a foreground model or a background model.

The foreground image is an image formed by extracting an area (foreground area) of a subject from an image acquired by imaging performed by a camera. The subject extracted for the foreground area indicates a dynamic subject (moving object) that moves (can change in absolute location or shape) in a case where imaging is performed from the same direction in time series. Examples of the subject include human figures, such as a player and a referee within a field in a game, and also include a ball in addition to the human figures if the game is a ball game. In a concert or entertainment, examples of the subject include a singer, an instrument player, a performer, and a presenter.

The background image is an image of an area (background area) at least different from the subject to be the foreground. Specifically, the background image is an image in a state where the subject to be the foreground is removed from the captured image. The background indicates an imaging target maintaining a still or close-to-sill state in a case where imaging is performed from the same direction in time series. Examples of such an imaging target include a stage of an event, such as a concert, a stadium where an event, such as a game, takes place, a structure, such as a goal used in a ball game, and a field. However, the background is an area at least different from the subject to be the foreground. In addition to the subject and the background, another object can be included as the imaging target.

The virtual camera is a virtual camera different from a plurality of imaging apparatuses placed around an imaging area, and is a concept to conveniently explain a virtual viewpoint related to generation of a virtual viewpoint image. In other words, the virtual viewpoint image can be considered as an image obtained by imaging from a virtual viewpoint set in a virtual space associated with the imaging area. The position and direction of the virtual viewpoint in this imaging can be expressed as the position and direction of the virtual camera. In other words, in a case where a camera is present at the position of a virtual viewpoint set in a space, the virtual viewpoint image can be said to be an image obtained by simulating an image obtained by this camera. In the present exemplary embodiment, the content of a temporal transition of a virtual viewpoint will be expressed as a virtual camera path. However, it is not essential to use the concept of the virtual camera in order to implement the configuration of the present exemplary embodiment. In other words, at least information representing a specific position and information representing a direction in a space can be set, and a virtual viewpoint image can be generated based on the set information.

FIG. 1 is a diagram illustrating an example of the digital content. The digital content in the present exemplary embodiment is a digital content focusing on a specific subject, and is a three-dimensional object including a virtual viewpoint image reflecting the specific subject. Alternatively, the digital content is a three-dimensional object associated with a virtual viewpoint image reflecting a specific subject. A digital content 100 in FIG. 1 is a cube, and has an image display area 102 for displaying a virtual viewpoint image, on a surface 101 on the left. The surface for placing the image display area 102 is not limited to the surface 101 and can be another surface. The shape of the digital content is not limited to the cube, and can be another shape. Examples of the shape include a spherical three-dimensional object associated with two different virtual viewpoint images, and a three-dimensionally shaped model indicating a subject associated with a virtual viewpoint image. The three-dimensionally shaped model indicating the subject can be a simple three-dimensionally shaped model created beforehand, or can be a three-dimensionally shaped model of a subject to be used for generation of a virtual viewpoint image. The three-dimensionally shaped model can only be associated with a virtual viewpoint image focusing on a specific subject and including the specific subject, but can further be associated with a virtual viewpoint image including another subject.

A non-fungible token (NFT) can be appended to the digital content. The NFT can give rarity by, for example, managing contents using serial numbers by restricting the amount of contents to be distributed, in order to increase the property value of the digital content. The NFT is a token for publication or circulation on a block chain. Examples of the format of NFT include a token standard called ERC-721 and a token standard called ERC-1155. The token is usually kept in association with a wallet managed by a user. In the present exemplary embodiment, the digital content will be described as a content to which an NFT is appended. The digital content to which the NFT is appended is recorded in a block chain, in association with the NFT, the identifier of the digital content, and a user identification (ID) indicating the owner of the digital content. In addition, the digital content has metadata in the outside of the block chain. In the metadata, the title, description, and Uniform Resource Locator (URL) of the content, and the like are stored. The metadata according to the present exemplary embodiment further includes virtual viewpoint information, imaging time information, subject position information, and subject identification information, but is not limited thereto.

The virtual viewpoint information, the imaging time information, the subject position information, and the subject identification information can be recorded in an external server as data that cannot be directly accessed by the user, together with the digital content. A playback time for the digital content is supposed to be uniform for each content.

In the imaging time information, the starting time and ending time of a virtual viewpoint image are recorded. The time of imaging is appended for every frame to an image captured by a camera, and therefore, the time of imaging is acquired and recorded in the imaging time information. The starting time is acquired from a captured image to be used in starting generation of the virtual viewpoint image, and the ending time is acquired from a captured image to be used in ending the generation. The acquired starting time and the ending time are recorded in the imaging time information. The starting time and the ending time each include information indicating the year, date, and time of imaging performed to obtain the image.

In the subject position information, information indicating the position of a subject (hereinafter referred to as the main subject) designated by the creator of the virtual viewpoint image is recorded. The main subject can be a subject appearing for the longest time at the center of the virtual viewpoint image, instead of the subject designated by the creator. The subject position information is, for example, data collected from global positioning system (GPS) information attached to the subject. The subject position information is indicated by three-dimensional Cartesian coordinates in a coordinate system in which three coordinate axes (X-axis, Y-axis, and Z-axis) intersect at right angles at the origin. This origin is, for example, the center of the center circle of a basketball court, and can be an arbitrary point within an imaging space. In the subject position information, information indicating the position of the subject in the time period from the starting time to the ending time of the subject position information is recorded.

The subject identification information consists of alphabets and numbers, and is an identification mark assigned to distinguish each subject. In the subject identification information, the identification mark assigned to the main subject of the subject position information is recorded.

The present exemplary embodiment is described using the metadata of the digital content, but is not limited thereto, and other metadata can be used.

Figure 2:
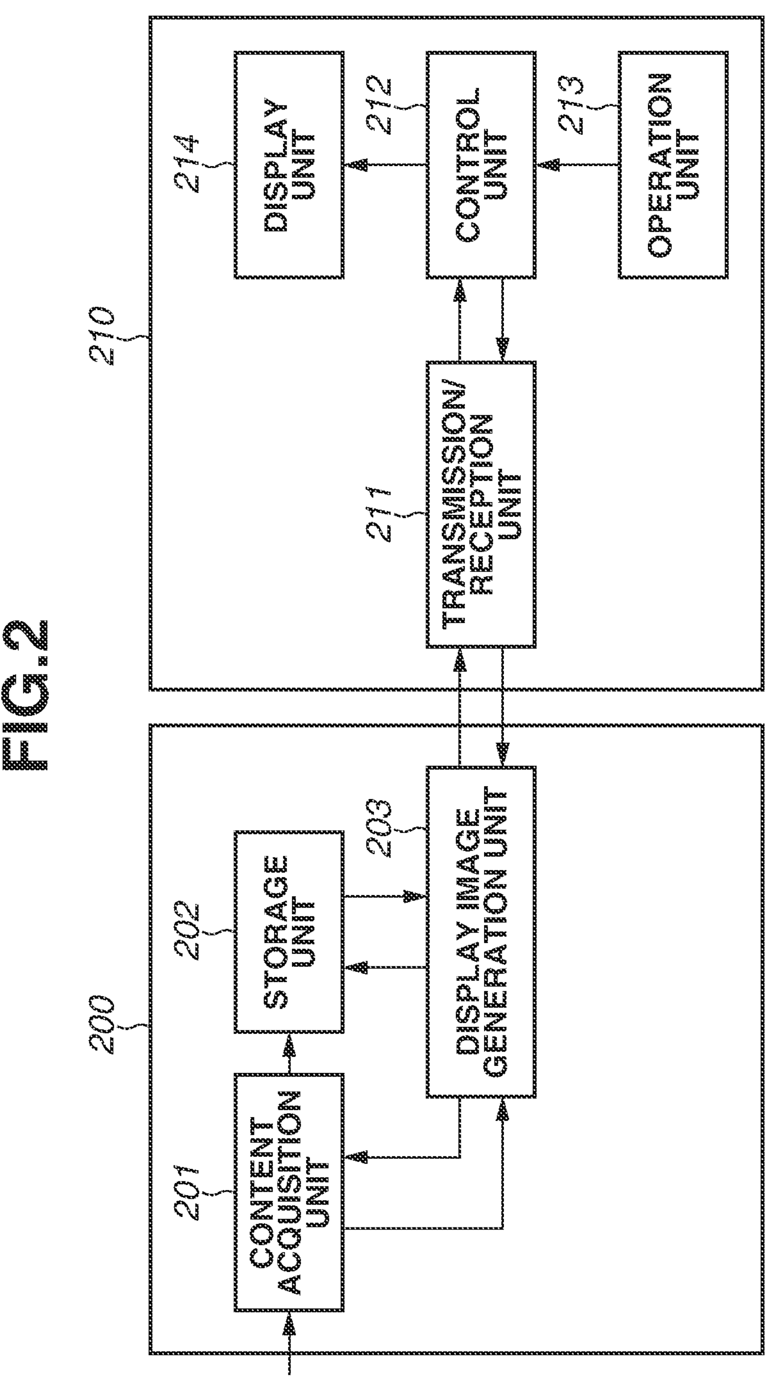
FIG. 2 is a diagram illustrating an example of an apparatus configuration of an image processing system.

FIG. 2 is a diagram illustrating an example of an apparatus configuration of the image processing system of the present exemplary embodiment. Some of functional blocks illustrated in FIG. 2 are implemented by causing a computer included in the image processing system to execute instructions of a computer program stored in a memory provided as a storage medium. However, some or all of those can be implemented by hardware. As the hardware, a dedicated circuit, such as an application specific integrated circuit (ASIC) or a processor (a reconfigurable processor, or a digital signal processor (DSP)) can be used.

The image processing system is composed of a management apparatus 200 and a user device 210. The management apparatus 200 includes a content acquisition unit 201, a storage unit 202, and a display image generation unit 203. The user device 210 includes a transmission/reception unit 211, a control unit 212, an operation unit 213, and a display unit 214.

The content acquisition unit 201 acquires a digital content from an external server (not illustrated). The content acquisition unit 201 acquires all digital contents related to a certain game, upon receiving an instruction from the display image generation unit 203. The unit per which the digital contents are acquired varies depending on the instruction from the display image generation unit 203. The digital content includes a virtual viewpoint image. In addition, an NFT is appended to the digital content. The content acquisition unit 201 acquires metadata, based on a URL described in the NFT. The content acquisition unit 201 transmits the digital content to which the NFT is appended and the metadata to the storage unit 202. The content acquisition unit 201 also transmits the metadata to the display image generation unit 203.

The storage unit 202 is a large-capacity storage device, such as a magnetic disk, an optical disk, or a semiconductor memory. The storage unit 202 stores a digital content acquired from the content acquisition unit 201. The digital content includes a virtual viewpoint image and audio data. The storage unit 202 also stores an NFT appended to the digital content and metadata. The storage unit 202 can be physically disposed outside the management apparatus 200. The virtual viewpoint image stored in the storage unit 202 can be stored in a format, such as Material Exchange Format (MXF). The virtual viewpoint image can also be compressed in a format, such as Moving Picture Experts Group 2 (MPEG2). However, the image format and the data compression method are not limited to these, and any image format and data compression method can be used. Compression encoding does not have to be performed.

The display image generation unit 203 transmits an instruction to acquire a digital content to the content acquisition unit 201, in response to a user request received from the user device 210. For example, the display image generation unit 203 can issue an instruction to acquire all the digital contents generated in a certain game. The display image generation unit 203 can also issue an instruction to acquire only a certain digital content. The display image generation unit 203 generates a trade image (trade screen) that displays a digital content (hereinafter referred to as the selected content) selected by a user from a plurality of digital contents, and a digital content (hereinafter referred to as the related content) related to the selected content. In this process, the display image generation unit 203 assigns a virtual viewpoint image acquired from the storage unit 202 to the display surface of the digital content. The display image generation unit 203 transmits the generated trade image to the user device 210. The display image generation unit 203 receives and manages metadata of all the digital contents acquired by the content acquisition unit 201. The display image generation unit 203 matches the metadata of the selected content against the metadata of the digital contents other than the selected content. As a result, the display image generation unit 203 extracts a digital content that has matching or partially matching metadata, and uses the extracted digital content as the related content.

The transmission/reception unit 211 transmits a user request generated by the control unit 212 to the management apparatus 200. The transmission/reception unit 211 also receives a trade screen generated by the display image generation unit 203 of the management apparatus 200.

The control unit 212 performs control for creating user information based on operation information received from the operation unit 213, and transmitting the created user information to the transmission/reception unit 211. The control unit 212 also performs control for displaying a trade image received from the transmission/reception unit 211 on the display unit 214. When displaying the trade image on the display unit 214, the control unit 212 generates and displays a graphical user interface (GUI) for a user to select a digital content.

The operation unit 213 is configured of, for example, a joystick, a touch panel, a mouse, and/or a keyboard, and is used by a user to select a digital content and to make a determination. In the present exemplary embodiment, the user device 210 will be described below as a tablet terminal, and the operation unit 213 will be described below as a touch panel.

The display unit 214 is composed of, for example, a liquid crystal display and a light emitting diode (LED), and displays a trade image received by the transmission/reception unit 211, based on control by the control unit 212. The display unit 214 also displays a GUI or the like for a user to select a digital content.

Figure 3:
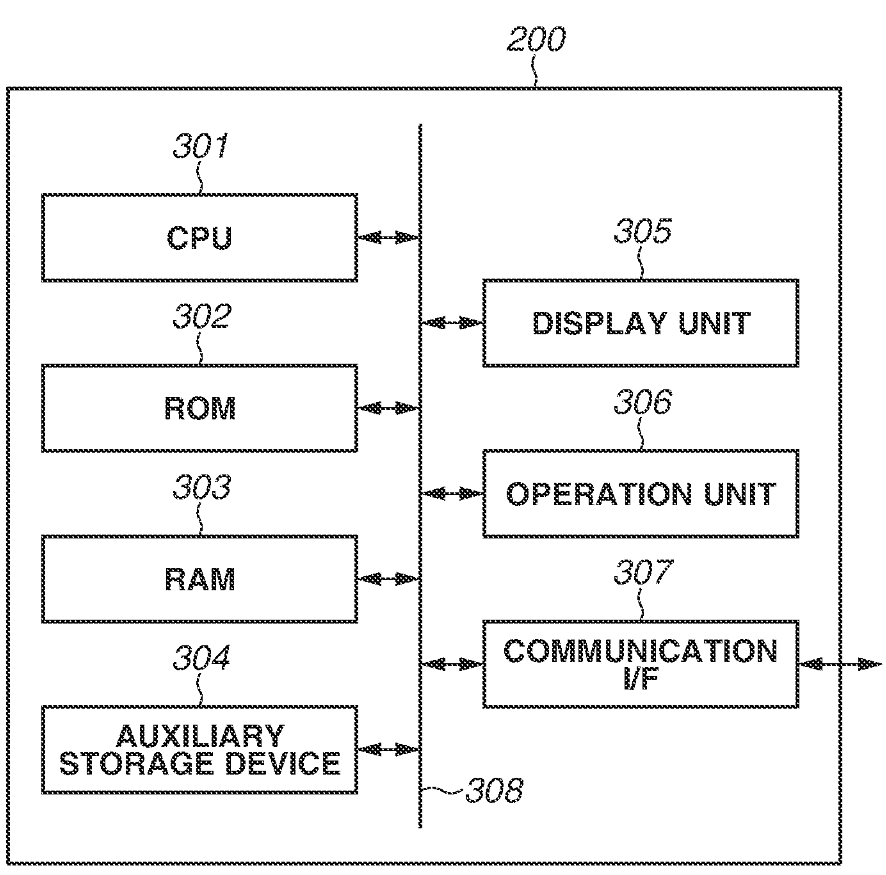
FIG. 3 is a diagram illustrating an example of a hardware configuration of a management apparatus.

FIG. 3 is a diagram illustrating a hardware configuration of the management apparatus 200 according to the first exemplary embodiment. The hardware configuration of the management apparatus 200 will be described with reference to FIG. 3. The user device 210 has a similar hardware configuration, and therefore the description of the hardware configuration of the user device 210 will be omitted.

The management apparatus 200 includes a central processing unit (CPU) 301, a read only memory (ROM) 302, a random access memory (RAM) 303, an auxiliary storage device 304, a display unit 305, an operation unit 306, a communication interface (IF) 307, and a bus 308.

The CPU 301 implements each of the functional blocks of the management apparatus 200 illustrated in FIG. 2, by controlling the entire management apparatus 200, using a computer program and the like stored in the ROM 302, the RAM 303, the auxiliary storage device 304, and the like.

The RAM 303 temporarily stores, for example, a computer program and data supplied from the auxiliary storage device 304, and data supplied from outside via the communication I/F 307. The auxiliary storage device 304 is configured of a device, such as a hard disk drive, and stores various data, such as image data, audio data, and digital contents.

The display unit 305 displays, for example, digital contents including virtual viewpoint images, and GUIs, as described above. The operation unit 306 inputs various instructions to the CPU 301 in response to input operations by a user, as described above. The CPU 301 operates as a display control unit that controls the display unit 305, and an operation control unit that controls the operation unit 306.

The communication I/F 307 is used for communication with an apparatus (e.g., an external server) located outside the management apparatus 200. For example, in a case where the management apparatus 200 is connected to an external apparatus by wire, a cable for communication is connected to the communication I/F 307. In a case where the management apparatus 200 has a function of wirelessly communicating with an external apparatus, the communication I/F 307 includes an antenna. The bus 308 interconnects the components of the management apparatus 200 to transmit information.

Figure 4:
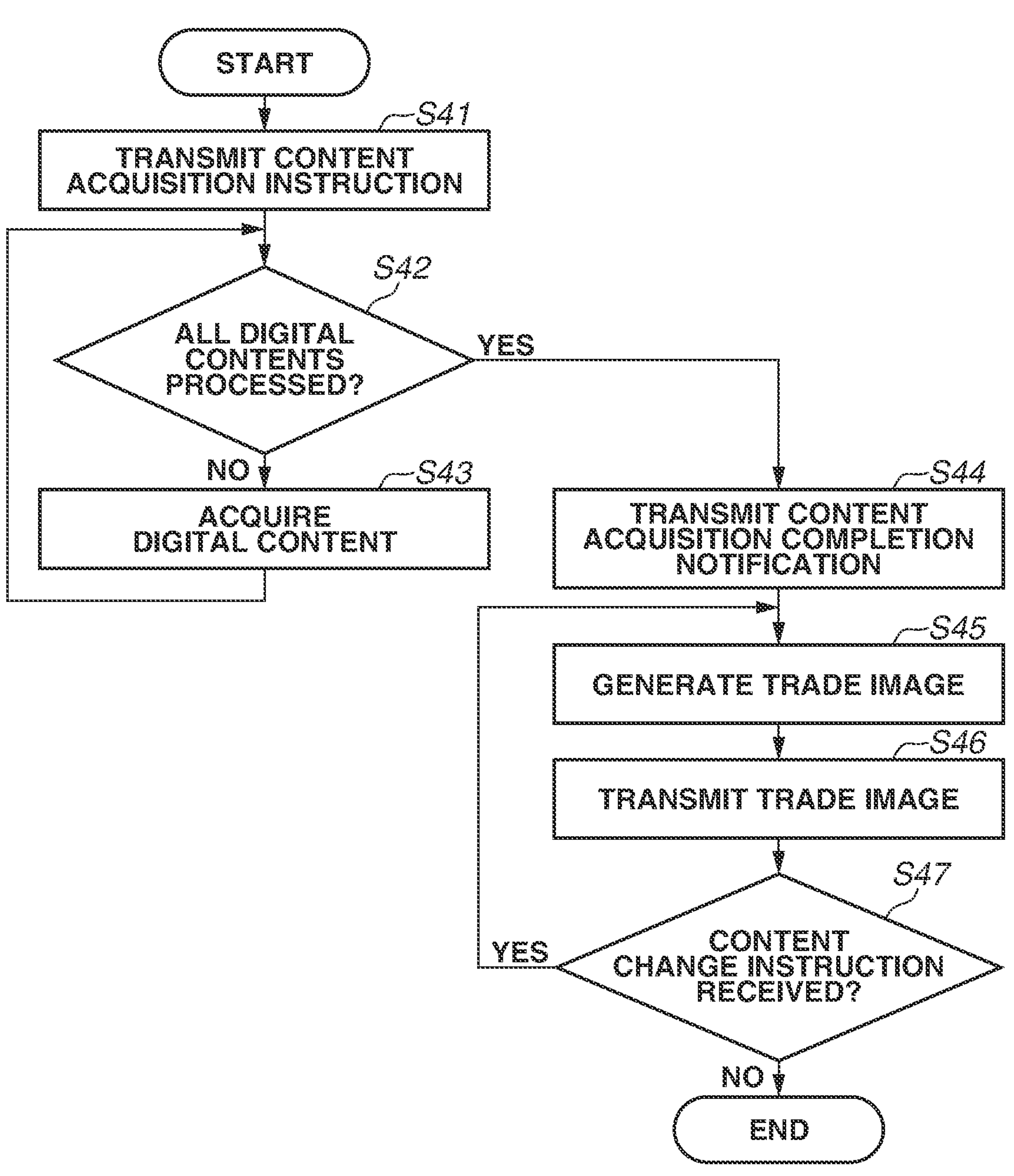
FIG. 4 is a flowchart illustrating a flow of operation of the management apparatus.

FIG. 4 is a flowchart illustrating a flow of operation of the management apparatus 200 according to the first exemplary embodiment. The CPU 301 serving as a computer of the management apparatus 200 executes a computer program stored in a memory, such as the ROM 302 or the auxiliary storage device 304, so that each step of the flowchart illustrated in FIG. 4 runs.

In step S41, the display image generation unit 203 transmits an instruction to acquire a digital content to the content acquisition unit 201. The unit per which digital contents are acquired is determined by a user request received from the transmission/reception unit 211 of the user device 210. For example, a list of all the results of the games having been held today is created and displayed when a trade screen is started.

When a user selects a game that the user wants to purchase from the list, the display image generation unit 203 transmits an instruction to acquire all the digital contents related to the selected game to the content acquisition unit 201. The unit per which the digital contents are acquired is not limited thereto, and the digital contents can be acquired by the team or player.

In step S42, it is determined whether all the digital contents to be processed in step S43 have been processed. The process in step S43 is repeated until all the digital contents are processed. Upon completion of all the processes, the operation proceeds to step S44.

In step S43, the content acquisition unit 201 acquires a digital content from an external server, based on an instruction of the display image generation unit 203. The digital content includes a virtual viewpoint image. The acquired digital contents are sequentially transmitted to the storage unit 202.

In addition, the content acquisition unit 201 assigns an identification number to each of the digital contents, and use the identification numbers when the digital contents are managed. For example, when the content acquisition unit 201 writes the digital content in the storage unit 202, the digital content can be managed in association with the writing destination and the identification number. This enables the display image generation unit 203 to read out the digital content using the identification number, when reading out the digital content from the storage unit 202. The identification number is not limited to this usage, and other purposes can also be used.

In step S44, the content acquisition unit 201 transmits a content acquisition completion notification to the display image generation unit 203. In this process, the content acquisition unit 201 also transmits metadata to the display image generation unit 203, in a form of accompanying the content acquisition completion notification. The metadata to be transmitted is data in a list form in which identification numbers and metadata are associated with each other (hereinafter referred to as the metadata management list).

In step S45, the display image generation unit 203 generates a trade image, which is triggered by receipt of the content acquisition completion notification from the content acquisition unit 201.

In step 546, the display image generation unit 203 transmits the trade screen generated in step S45 to the transmission/reception unit 211 of the user device 210.

In step S47, the display image generation unit 203 determines whether a user instruction to change the selected digital content is received from the transmission/reception unit 211 of the user device 210. In a case where a user instruction to change the selected digital content is received (YES in step S47), the operation returns to step S45. In a case where a determination button of the trade screen is pressed (NO in step S47), the operation of this flow ends, and the current image changes to a purchase screen or the like. In a case where there is no user instruction, the display image generation unit 203 waits in this step.

Figure 5:
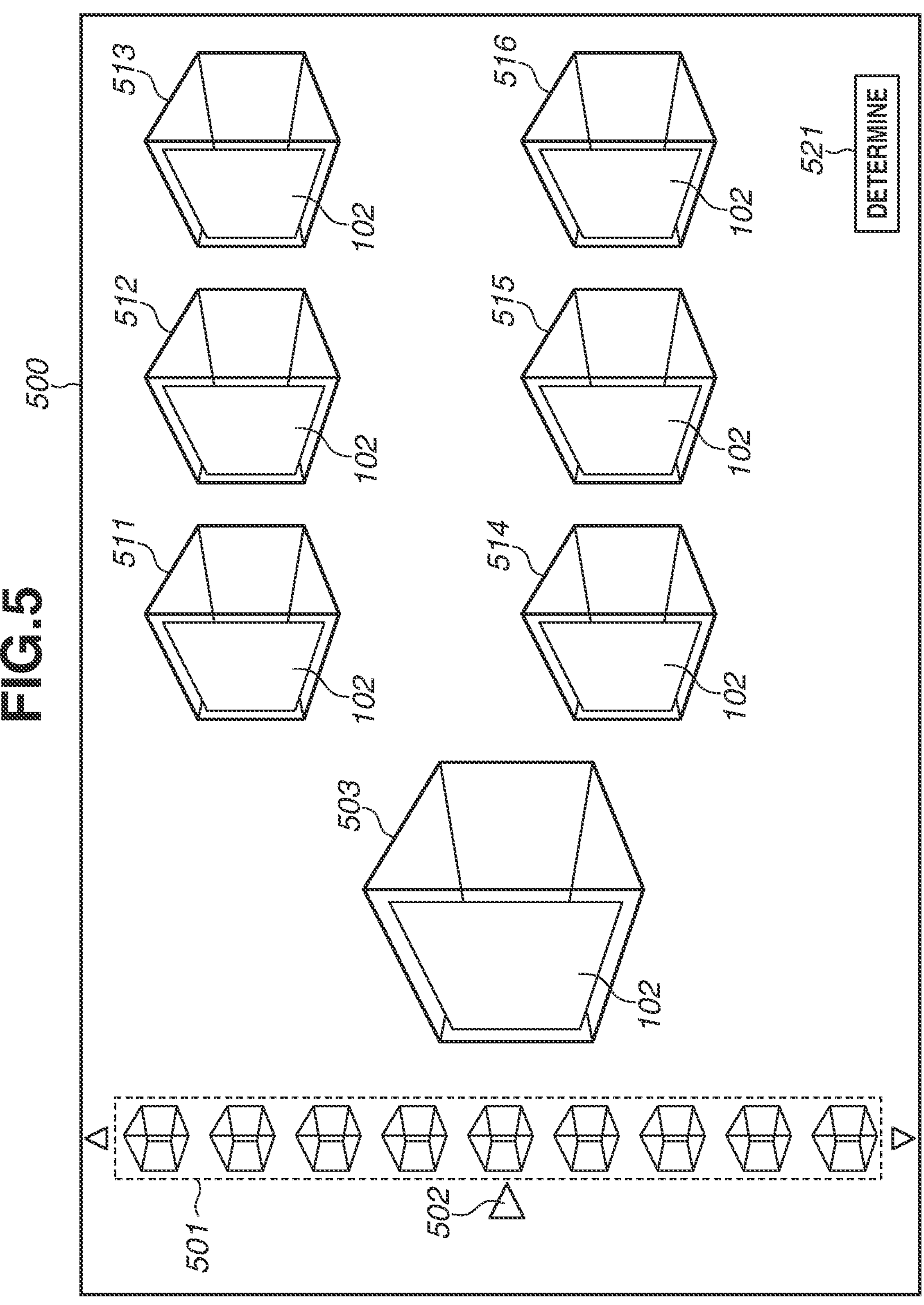
FIG. 5 is a diagram illustrating an example of a trade screen according to a first exemplary embodiment.

FIG. 5 illustrates an example of a trade screen 500 generated by the display image generation unit 203.

A content list 501, which is a portion indicated by a broken line in FIG. 5, is an area that displays digital contents in a column. The display image generation unit 203 displays digital contents read out from the storage unit 202, in the content list 501. The digital contents displayed in the content list 501 can be scrolled up and down by user operations. Digital contents not appearing in the content list 501 can be found by scrolling. The layout of the content list 501 is not limited to one vertical column, and can be another layout, such as one horizontal row.

A content selection arrow 502 indicates a digital content being selected from among the digital contents displayed in the content list 501. The digital content to which the content selection arrow 502 points is expanded and displayed at the position of a selected content 503.

The digital content displayed as the selected content 503 is changed by scrolling the content list 501. The displayed digital content can be changed by selection of a desired digital content from the digital contents displayed in the content list 501 by a touch operation or the like of a user. In such a case, the content selection arrow 502 is displayed at a position corresponding to the selected content in the content list 501.

Related contents 511 to 516 are digital contents having close relationship with the selected content 503. The display image generation unit 203 selects the related contents using the metadata management list acquired from the content acquisition unit 201. The method of selecting the related contents will be described below. The display image generation unit 203 can arrange the related contents, based on a selection list generated by the selection method to be described below. For example, in a case where priority levels are attached to the related contents to be included in the selection list, the related contents are arranged according to the priority level.

In such a case, the related contents having higher priority levels can be arranged at positions closer to the selected content.

The arrangement method is not limited thereto and can be another method.

A determination button 521 is a button for determining the purchase of a digital content. The user can select a digital content that the user wants to purchase from the digital contents displayed in the trade screen 500, and purchase the selected digital content by pressing the determination button 521. The simultaneous purchase of a plurality of digital contents can be done by pressing the determination button 521 in a state where the plurality of digital contents is designated.

The selected content and the related contents displayed in the trade screen 500 each have the image display area 102. The display image generation unit 203 acquires a virtual viewpoint image associated with the selected content or the related content from the storage unit 202, and the virtual viewpoint image is assigned to and displayed in the image display area 102.

Figure 6:
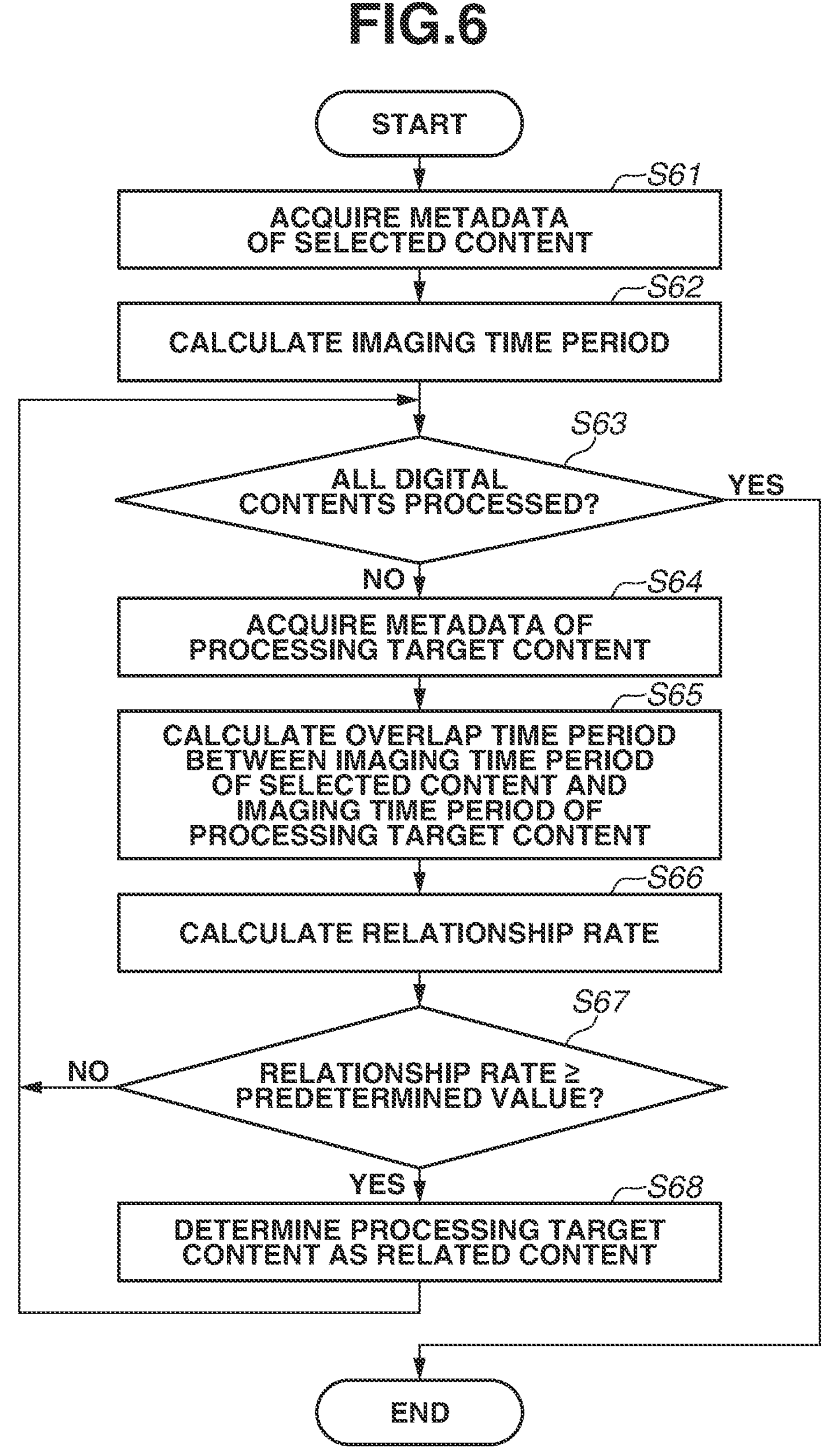
FIG. 6 is a flowchart illustrating a method of selecting a related content according to the first exemplary embodiment.

FIG. 6 is a flowchart illustrating the method of selecting the related content according to the first exemplary embodiment. The flowchart functions at the timing of step S45 in the flowchart illustrated in FIG. 4.

In step S61, the CPU 301 acquires the metadata of the selected content from the metadata management list.

In step S62, the CPU 301 calculates an imaging time period, based on the imaging time information included in the metadata of the selected content. The starting time and ending time of the virtual viewpoint image are included in the imaging time information. The number of frames existing from the starting time to the ending time are calculated as the imaging time period. In the present exemplary embodiment, the virtual viewpoint image is generated in 60 frames. For example, if the starting time of the selected content corresponds to the frame at 18:30:30.04 on Jan. 1, 2021, and the ending time corresponds to the frame at 18:30:45.04 on Jan. 1, 2021, the imaging time period is 900 frames.

In step S63, the CPU 301 determines whether all the digital contents to be included in the metadata management list except the selected content have been processed. The processes in step S64 to step S66 are repeated until all the digital contents are processed. For example, the top to the bottom of the metadata management list are sequentially processed. Upon completion of all the processes, the flow of this flowchart ends.

In step S64, the CPU 301 acquires the metadata of the digital content determined as a processing target in step S63, from the metadata management list.

In step S65, the display image generation unit 203 calculates an overlap time period between the selected content and the processing target content, based on the imaging time information included in the metadata acquired in step S64. Specifically, an overlap starting time and an overlap ending time are extracted from the starting time and ending time of the selected content and the starting time and ending time of the processing target content. Afterward, the overlap time period is calculated by determining the difference between the overlap starting time and the overlap ending time. For example, suppose the starting time of the selected content corresponds to the frame at 18:30:30.01 on Jan. 1, 2021, and the ending time corresponds to the frame at 18:30:45.01 on Jan. 1, 2021. Further, suppose the starting time of the processing target content corresponds to the frame at 18:30:33.01 on Jan. 1, 2021, and the ending time corresponds to the frame at 18:30:50.01 on Jan. 1, 2021. In this case, the overlap starting time corresponds to the frame at 18:30:33.01 on Jan. 1, 2021, and the overlap ending time corresponds to the frame at 18:30:45.01 on Jan. 1, 2021, and thus the overlap time period is 720 frames.

In step S66, the CPU 301 calculates an index (hereinafter referred to as the relationship rate) indicating the relationship between the selected content and the processing target content. The relationship rate can be calculated by dividing the overlap time period calculated in step S65 by the imaging time period calculated in step S62.

In step S67, the display image generation unit 203 determines whether the processing target content is a related content.

In a case where the relationship rate calculated in step S66 is higher than or equal to a predetermined value (YES in step S67), the operation proceeds to step S68 to determine the processing target content as the related content. For example, in a case where the relationship rate is 80% or more, the processing target content is to be determined as the related content.

In other words, a digital content whose ratio of the imaging time period overlapping the imaging time period of the selected content is high is determined as the related content. In a case where the display image generation unit 203 determines that the processing target content is not a related content (NO in step S67), the processing returns to step S63. The predetermined value can be changed depending on the event, such as a sporting event.

In step S68, the display image generation unit 203 determines the processing target content as the related content. The display image generation unit 203 then stores the identification number of the determined related content in the selection list.

The related content is selected based on the imaging time information included in the metadata, but it is not limited thereto. The related content can be selected using the subject identification information included in the metadata. In this case, a digital content having the same subject identification information as the subject identification information of the selected content can be selected as the related content.

In the present exemplary embodiment, the number of the related contents to be displayed is not predefined, but can be predefined. In such a case, contents are displayed as the related contents in descending order of the relationship rate, starting from the content having the highest relationship rate, and when the number of the contents reaches the predefined number, the subsequent contents are not displayed.

According to the first exemplary embodiment, the digital content whose relationship rate to the selected content is high is determined as the related content, based on the imaging time information. This makes it possible to display the selected content and the related content that are about equal in terms of the imaging time period in the trade screen. Thus, the user can not only purchase the selected content, but also find a desired digital content from the related contents and purchase the found digital content.

The digital content having the overlapping imaging time is determined as the related content, and therefore a digital content reflecting the same scene is determined as the related content. Thus, a digital content including a virtual viewpoint image viewed from a viewpoint different from the viewpoint of the content selected by the user can be displayed as the related content.

In the first exemplary embodiment, the digital content whose relationship rate to the selected content is high is determined as the related content, based on the imaging time information. However, in a case where it is desired to identify a related content reflecting a specific subject selected by a user, there is a possibility that an appropriate related content cannot be identified. In a second exemplary embodiment, the related content is determined based on, in addition to the relationship rate based on the imaging time information, the reflection time period of the main subject of the digital content selected by the user. This will be described below with reference to FIG. 7 and FIG. 8.

Figure 7:
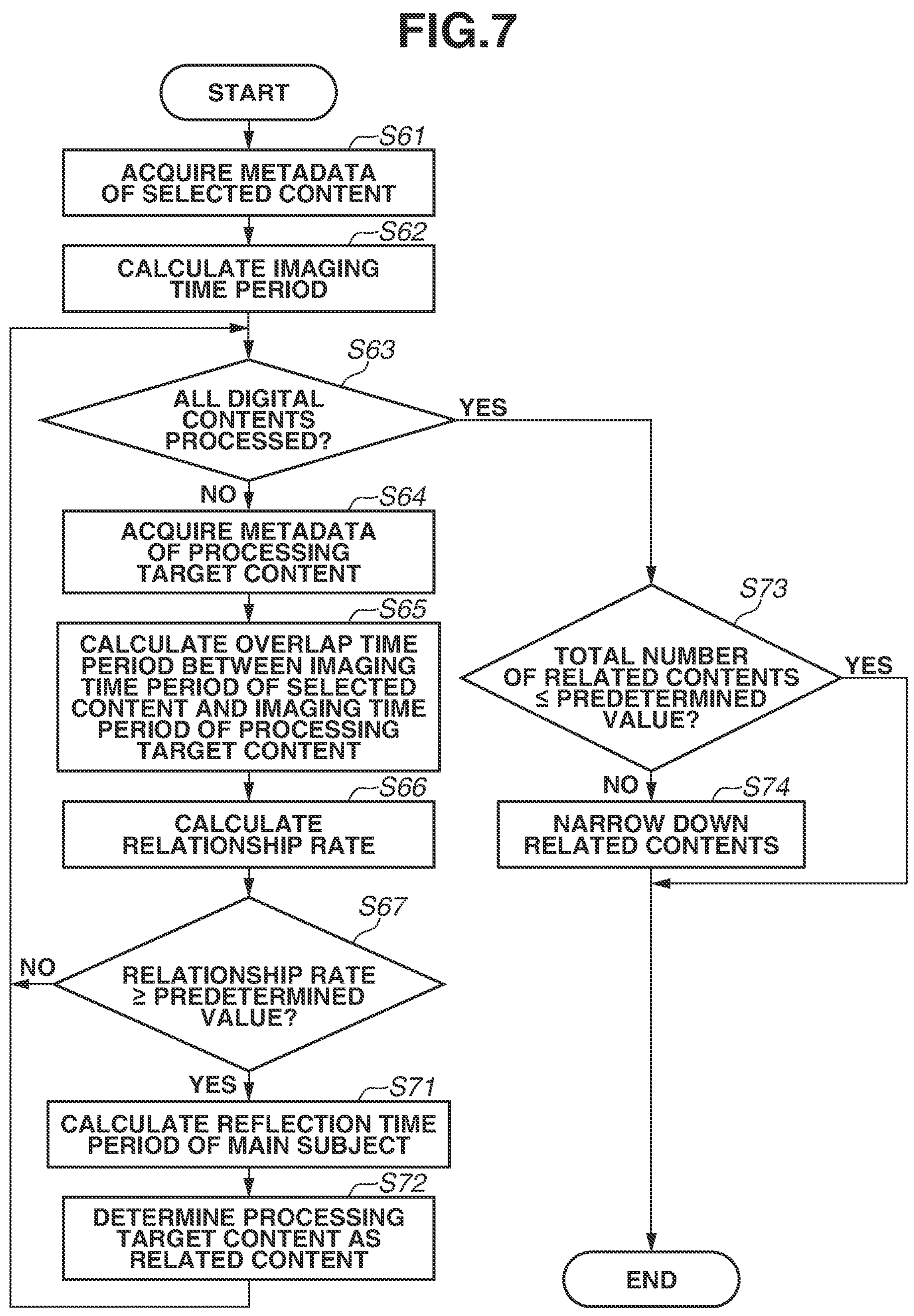
FIG. 7 is a flowchart illustrating a method of selecting a related content according to a second exemplary embodiment.

FIG. 7 is a flowchart illustrating the method of selecting the related content according to the second exemplary embodiment. This flowchart runs at the timing of step S45 in the flowchart illustrated in FIG. 4. In FIG. 7, each step having the same reference numeral as the reference numeral of the step in FIG. 6 is a process similar thereto, and thus the description thereof will be omitted.

In step S71, the CPU 301 calculates the reflection time period during which the main subject of the selected content is reflected in the view from the virtual viewpoint of the processing target content. The display image generation unit 203 acquires the subject position information and the virtual viewpoint information included in the metadata of the selected content acquired in step S61. The position information of the main subject in the view from the virtual viewpoint is recorded in the subject position information in time series. In the virtual viewpoint information, the position and orientation of the virtual viewpoint is recorded in time series. The display image generation unit 203 calculates the reflection time period during which the main subject of the selected content is reflected in the view from the virtual viewpoint of the processing target content, based on the subject position information and the virtual viewpoint information.

Figure 8:
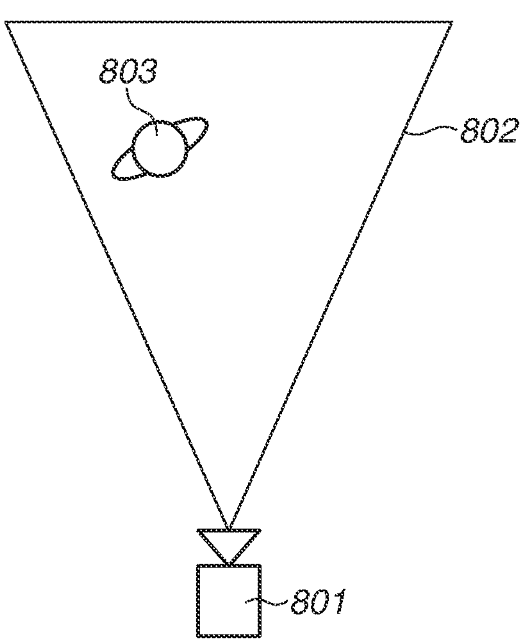
FIG. 8 is a schematic diagram illustrating determination of reflection of a main subject according to the second exemplary embodiment.

FIG. 8 is a schematic diagram illustrating determination of the reflection of the main subject.

A virtual viewpoint 801 is the virtual viewpoint of the processing target content. An imaging range 802 of the virtual viewpoint 801 can be identified based on the position and orientation of the virtual viewpoint recorded in the virtual viewpoint information of the processing target content. A main subject 803 is the main subject of the selected content. The main subject 803 is determined based on the subject position information included in the metadata of the selected content.

The display image generation unit 203 determines the reflection of the main subject, based on whether the main subject 803 is included in the imaging range 802. In the case in FIG. 8, the main subject 803 is included in the imaging range 802, and thus the reflection of the main subject is determined to be present. The determination of the reflection of the main subject is performed for all the frames included in the overlap time period calculated in step S65. The cumulative number of frames for which the reflection is determined to be present is determined as the reflection time period of the main subject.

In step S71, the reflection time period during which the main subject of the selected content is reflected in the view from the virtual viewpoint of the processing target content is calculated by the display image generation unit 203, but is not limited thereto. For example, the metadata can include the result of calculating the reflection time period for each subject, and the display image generation unit 203 can acquire, from the metadata, the reflection time period of the main subject of the selected content. In this case, the metadata includes the reflection time period of each of all the subjects reflected in the view from the virtual viewpoint of the processing target content. The method of calculating the reflection time period is similar to the processing method described above with reference to FIG. 8.

In step S72, the display image generation unit 203 determines the processing target content as the related content. The display image generation unit 203 then stores the reflection time period of the main subject calculated in step S71, in the selection list.

In step S73, the display image generation unit 203 determines whether the total number of the related contents determined in step S72 is less than or equal to a predetermined value. The predetermined value is determined based on the number of the related contents that can be displayed in the trade screen. In a case where the total number of the related contents is more than the predetermined value (NO in step S73), the operation proceeds to step S74. In a case where the total number is less than or equal to the predetermined value (YES in step S73), the flow of this flowchart ends.

In step S74, the display image generation unit 203 narrows down the related contents so that the number of the related contents does not exceed the upper limit that can be displayed in the trade screen. The display image generation unit 203 analyzes the selection list generated in step S72, and adds a priority level to each of the related contents. The priority level is determined by comparing the reflection time periods of the main subject of the respective related contents recorded in the selection list. For example, the priority levels are added such that a higher level is given to the related content whose reflection time period of the main subject is longer.

According to the second exemplary embodiment, the related content in which the main subject of the selected content is reflected is displayed in the trade screen. This makes it possible to display the related content having a closer relationship than in the first exemplary embodiment.

In the first exemplary embodiment, the content selected from the content list 501 by the user and the related content are displayed. However, there is a possibility that the user cannot easily understand how the related content is related to the selected content. Thus, in a third exemplary embodiment, a trade image in which the selected content and the related content are arranged in a virtual space based on the subject position information is generated. The generated image is not limited to the trade image, and a display image that displays digital contents owned by the user can be used.

The third exemplary embodiment will now be described with reference to FIG. 9 to FIG. 11.

Figure 9:
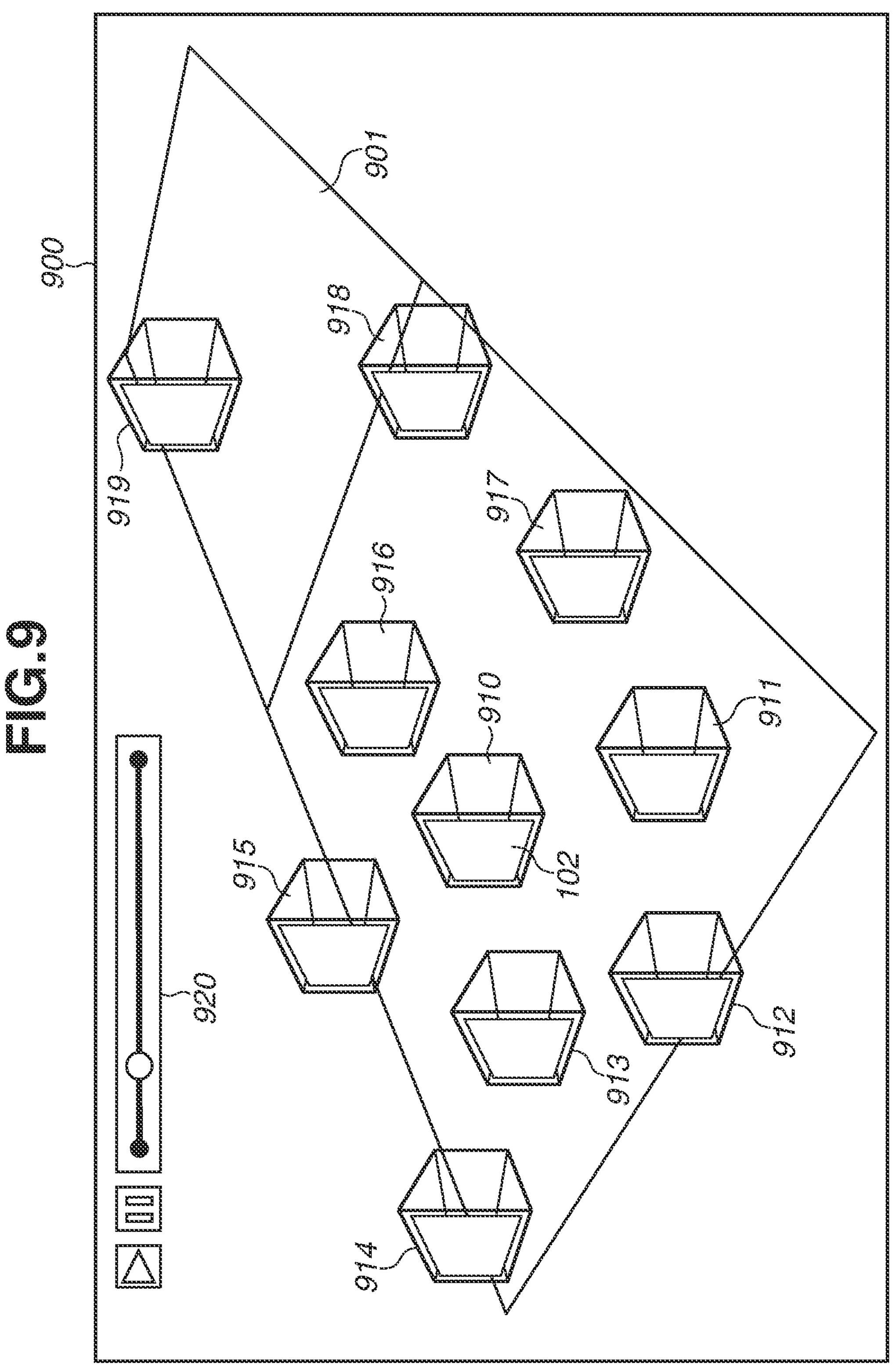
FIG. 9 is a diagram illustrating an example of a trade screen according to a third exemplary embodiment.

FIG. 9 illustrates an example of a trade screen 900 generated by the display image generation unit 203 in step S45. The trade screen 900 is a display image that displays a basketball court 901 viewed from a viewpoint obliquely from above. On the basketball court 901, digital contents 910 to 919 of the respective players are arranged. The virtual viewpoint image is displayed in the image display area 102 of the digital content. Although not illustrated, the name of the player is displayed on one of the surfaces of the digital content. The display image is not limited thereto, and a downward viewpoint to view the basketball court 901 from directly above can be used. Alternatively, the viewpoint of the basketball court 901 can also be freely changeable by a user operation. The basketball court 901 indicates a virtual space in which digital contents are arranged. The virtual space is changed depending on the digital content. In a case where the digital content includes a virtual viewpoint image of soccer, a soccer field is the virtual space. In a case where the digital content includes a virtual viewpoint image of tennis, a tennis court is the virtual space. In the present exemplary embodiment, the basketball court 901 is a three-dimensional model, but is not limited thereto, and can be an image. The trade screen further displays a playback GUI 920.

Figure 10:
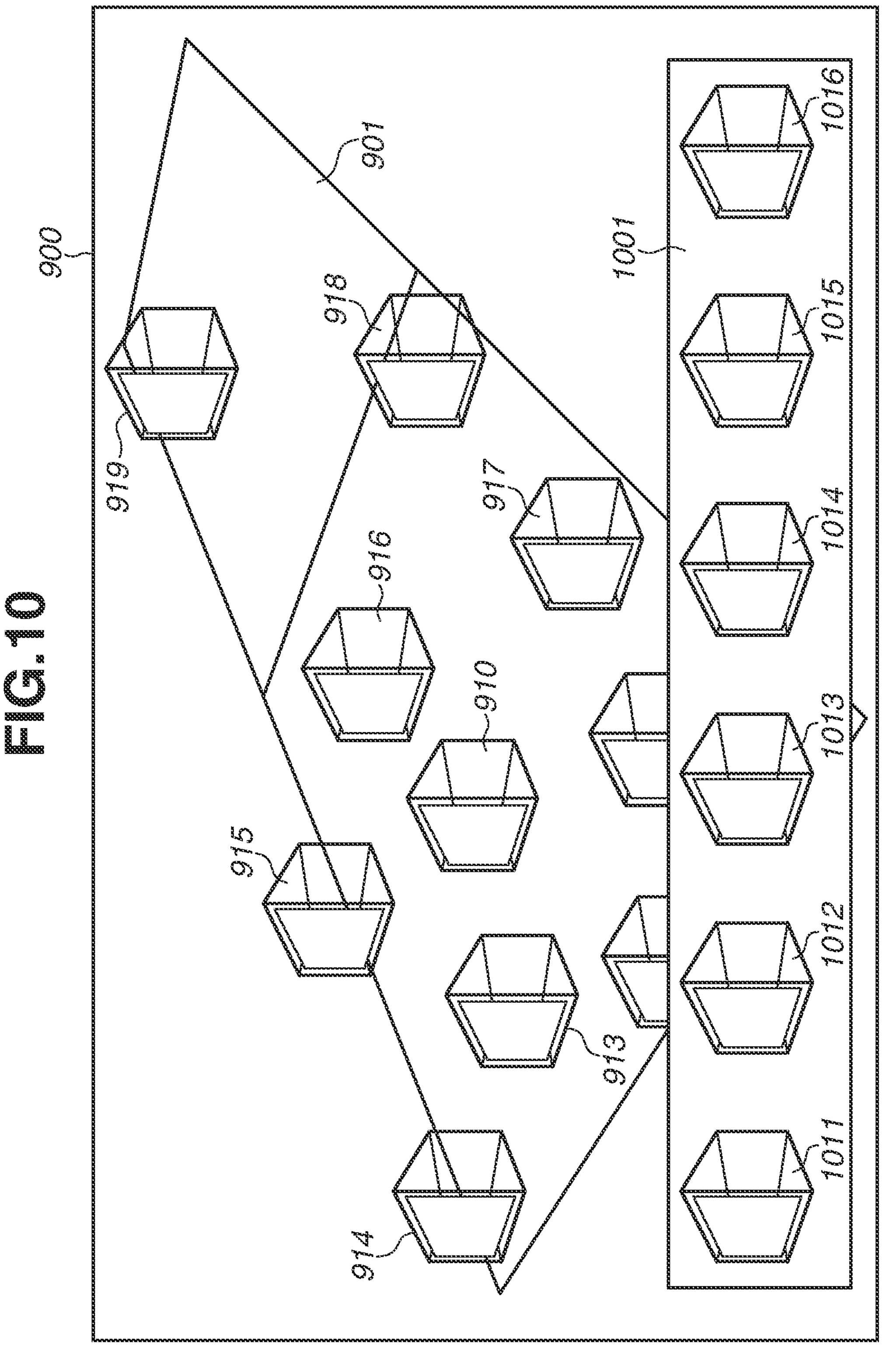
FIG. 10 is a diagram illustrating an example of a trade screen after change according to the third exemplary embodiment.

If the digital content of a desired player is selected from the digital contents on the basketball court 901, the current image changes to the trade screen 900 illustrated in FIG. 10. For example, if a digital content 910 is selected in the trade screen 900 in FIG. 9, a time-series list 1001 superimposed on the trade screen 900 is displayed. The time-series list 1001 is a list in which other digital contents 1011 to 1016 targeting the same main subject as the main subject of the digital content 910 are arranged from left in chronological order. In other words, the time-series list 1001 focuses on the subject of the digital content selected by the user, and displays a list of the digital contents of this subject that are generated in the same game. The digital content to be displayed in the time-series list 1001 may only be the main subject of the digital content selected by the user, and therefore a digital content corresponding to a different scene may be displayed.

The display image generation unit 203 sorts the digital contents targeting the same main subject, based on the subject identification information of the metadata included in the metadata management list. Subsequently, the display image generation unit 203 rearranges the sorted digital contents in chronological order, based on the imaging time information of the metadata, and displays the rearranged digital contents in the time-series list 1001.

The user can select a desired digital content from the digital contents displayed in the time-series list 1001. For example, suppose the digital contents of all the shots made by a certain player before the end of the game are displayed in the time-series list 1001. If the user desires the digital content of a dunk shot sunk 15 minutes after the start of the game, the user can select this digital content.

When a digital content displayed in the time-series list 1001 is selected, the current image returns to the trade screen 900 in FIG. 9. When returning to the trade screen 900 in FIG. 9, the digital contents on the basketball court 901 are updated. For example, in a case where the time-series list 1001 is displayed upon selection of the digital content 910, the digital content 910 is replaced by the digital content selected in the time-series list 1001. The digital contents 911 to 919 except the digital content 910 are processed as the related contents of the digital content 910. The digital contents 911 to 919 are each replaced by the most appropriate digital content, based on a method of selecting the related content to be described below.

Simultaneously with the update of the digital content, the digital content is placed based on the subject position information included in the metadata of the digital content after the update. Specifically, the digital content is placed at a position in the virtual space corresponding to the position of the subject in the three-dimensional space. Afterward, the digital content moves so that the selected content is played back for the imaging time period. Specifically, the digital content moves on the basketball court 901, based on the subject position information of the digital content 910. At this time, the digital contents 911 to 919 move to synchronize with the imaging time of the digital content 910. In this process, at the time when the imaging time of the related content does not overlap the imaging time of the selected content, the digital content is placed based on the subject position information at the closest imaging time among the overlapping imaging times. In other words, at the time when the imaging time does not overlap the imaging time of the selected content, the related content does not move, and when the overlapping time arrives, the related content moves. After the playback to the ending time of the digital content 910 is completed, the playback can be automatically repeated from the starting time.

The playback GUI 920 includes a button for the playback of the selected content for the imaging time period and a button for a pause of the playback, and also includes a seek bar for the imaging time period. The user can roughly understand how the subject of the selected content and the subject of the related content move in the video image, by playing back the selected content for the imaging time period. The positional relationship between the subjects and motions can therefore be understood accurately.

In the image display area 102 of the digital content, the virtual viewpoint image is displayed to synchronize with the playback time.

In a case where the related content is not found in any one of the digital contents 911 to 919, the degree of transparency of this digital content can be increased to display the digital content in a light color.

FIG. 11 is a flowchart illustrating the method of selecting the related content according to the third exemplary embodiment.

The flow of this flowchart runs at the timing of step S45 in the flowchart illustrated in FIG. 4. In FIG. 11, each step having the same reference numeral as the reference numeral of the step in each of FIG. 6 and FIG. 7 is a process similar thereto, and therefore the description thereof will be omitted.

In step S1100, the display image generation unit 203 determines the related content to be assigned to each subject (player). First, the display image generation unit 203 acquires the metadata of the related contents from the metadata management list, using the identification numbers included in the selection list generated in step S72. Based on the subject identification information included in the metadata, the display image generation unit 203 classifies the related contents in the selection list into groups of the respective pieces of subject identification information. Afterward, the display image generation unit 203 compares the reflection time periods of the main subject associated with the related contents for each of the groups. As a result of the comparison, the display image generation unit 203 determines the related content having the longest reflection time period of the main subject, as the related content to be assigned to the subject. Thus, the related content to be assigned to each of the digital contents 911 to 919 is determined by the process in this step.

According to the third exemplary embodiment, the digital content moves based on the position information of the corresponding subject. The position of the subject on the basketball court and the play of the subject can thereby be understood at the same time. The positional relationship between the subjects can also be understood.

In the present exemplary embodiment, the selected content and the related contents are arranged in the three-dimensional space based on the subject position information corresponding to each of the contents. However, it is conceivable that the number of the related contents corresponding to the same scene as the scene of the selected content can be small. In such a case, the position information of subjects included in the imaging range of the virtual viewpoint image of the selected content can be acquired, and the positional relationship between the subjects included in the selected content can be displayed, instead of the related contents. Specifically, a simple three-dimensionally shaped model is placed at each of the position of the main subject of the selected content and the position of other subjects. This makes it possible to understand the positional relationship between the main subject of the selected content and other subjects, so that detailed information for the user to determine whether the content selected by the user is a desired digital content can be provided.

In a case where the digital content in the present exemplary embodiment is a simple three-dimensionally shaped model indicating the subject, the color of the three-dimensionally shaped model can be changed for each subject. For example, in a digital content of basketball, the team color of a team to which the subject belongs is the color. In that case, the team name of the subject is recorded in the metadata. Further, in a case where the digital content in the present exemplary embodiment is a three-dimensionally shaped model of the subject to be used for generation of the virtual viewpoint image, subject shape information corresponding to the imaging time is further recorded in the metadata. In that case, the three-dimensionally shaped model of the subject corresponding to each of the digital contents moves on the basketball court, so that the play of the subject can be understood in detail.

According to the present disclosure, a desired digital content can be easily identified from a plurality of digital contents.

In the above-described exemplary embodiments, the case where the basketball game is imaged is described as an example, but the imaging target is not necessarily limited thereto. The present exemplary embodiments can also be applied to imaging of games of other sports, such as soccer, rugby, tennis, and ice-skating, and to performances at events, such as live shows and concerts.

In the above-described exemplary embodiments, the image illustrated in each of FIG. 5, FIG. 9, and FIG. 10 is described as the trade screen, but is not limited thereto. For example, the image can be a display image to display digital contents owned by a user.

The present disclosure is described above in detail based on the plurality of exemplary embodiments, but is not limited to the above-described exemplary embodiments. Various changes can be made based on the gist of the present disclosure, and those are not excluded from the scope of the present disclosure.

A computer program that implements the functions of the above-described exemplary embodiments to implement a part or all of the control in the present exemplary embodiments can be supplied to an image processing system or the like via a network or any of various storage mediums. Further, a computer (or a CPU or a micro processing unit (MPU)) in the image processing system or the like can read out and execute the program. In that case, the program and the storage medium storing the program constitute the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-151518, filed Sep. 22, 2022, which is hereby incorporated by reference herein in its entirety.

What is claimed is:

1. An image processing apparatus comprising:

one or more memories storing instructions; and one or more processors capable of executing the instructions causing image processing apparatus to:

acquire a plurality of three-dimensional objects each including a virtual viewpoint image that is a virtual viewpoint image generated based on a plurality of images captured by a plurality of imaging apparatuses and is associated with one subject;

identify a first three-dimensional object based on a user operation, among the plurality of three-dimensional objects;

identify a second three-dimensional object different from the first three-dimensional object and including a virtual viewpoint image that includes the subject associated with the virtual viewpoint image of the first three-dimensional object within the virtual viewpoint image of the second three-dimensional object, which includes a subject associated with a virtual viewpoint image of the first three-dimensional object, the subject being included simultaneously with the subject of the first three-dimensional object within an imaging range of a same virtual camera corresponding to a virtual viewpoint image, among the plurality of three-dimensional objects; and generate a display image including the first three-dimensional object and the second three-dimensional object.

2. The image processing apparatus according to claim 1, wherein each of the first three-dimensional object and the second three-dimensional object is a solid-shaped three-dimensional object having a display surface for displaying a virtual viewpoint image.

3. The image processing apparatus according to claim 1, wherein the first three-dimensional object is a three-dimensionally shaped model indicating a subject associated with a first virtual viewpoint image, and wherein the second three-dimensional object is a three-dimensionally shaped model indicating a subject associated with a second virtual viewpoint image.

4. The image processing apparatus according to claim 1, wherein each of the first three-dimensional object and the second three-dimensional object is given metadata.

5. The image processing apparatus according to claim 4, wherein the metadata includes at least one of imaging time information, subject position information, and subject identification information.

6. The image processing apparatus according to claim 1, wherein the first three-dimensional object and the second three-dimensional object include a virtual viewpoint image indicating a same scene.

7. The image processing apparatus according to claim 1, wherein the second three-dimensional object is identified, based on a time period during which the subject associated with the virtual viewpoint image of the first three-dimensional object is included in an imaging range of the virtual camera, among the plurality of three-dimensional objects.

8. The image processing apparatus according to claim 5, wherein, based on the imaging time information of the first three-dimensional object, the second three-dimensional object is identified having the imaging time information in which a ratio of an overlapping imaging time is higher than a predetermined value, among the plurality of three-dimensional objects.

9. The image processing apparatus according to claim 1, wherein the display image includes a background indicating a virtual space.

10. The image processing apparatus according to claim 9, wherein the background is at least one of a basketball court, a soccer field, and a tennis court.

11. The image processing apparatus according to claim 5, wherein the display image is an image in which the first three-dimensional object and the second three-dimensional object are arranged in a virtual space, based on the subject position information of each of the first three-dimensional object and the second three-dimensional object.

12. The image processing apparatus according to claim 11, wherein the display image is a virtual viewpoint image, in which the first three-dimensional object is placed at a position in a virtual space, corresponding to a position in a three-dimensional space, of the subject associated with the virtual viewpoint image of the first three-dimensional object, and the second three-dimensional object is placed at a position in the virtual space, corresponding to a position in the three-dimensional space, of a subject associated with the virtual viewpoint image of the second three-dimensional object, and which corresponds to a virtual camera having an imaging range to include the first three-dimensional object and the second three-dimensional object.

13. The image processing apparatus according to claim 12, wherein, in the display image, the position of the first three-dimensional object and the position of the second three-dimensional object are changed based on the imaging time information of the first three-dimensional object.

14. The image processing apparatus according to claim 11, wherein the display image is a virtual viewpoint image, and wherein a virtual viewpoint image corresponding to a position and direction of a virtual camera designated by a user is generated.

15. An image processing apparatus comprising:

one or more memories storing instructions; and one or more processors capable of executing the instructions causing image processing apparatus to:

acquire a three-dimensional object including a virtual viewpoint image that is a virtual viewpoint image generated based on a plurality of images captured by a plurality of imaging apparatuses and is associated with one subject;

identify a first three-dimensional object based on a user operation, among the plurality of three-dimensional objects;

identify a second three-dimensional object different from the first three-dimensional object and including a virtual viewpoint image that includes the subject associated with the virtual viewpoint image of the first three-dimensional object within the virtual viewpoint image of the second three-dimensional object, the inclusion being determined based on at least one of imaging time information or subject position information corresponding to the plurality of three-dimensional objects; and generate a virtual viewpoint image that includes the first three-dimensional object placed in a virtual space based on position information of a subject associated with the virtual viewpoint image of the first three-dimensional object, and the second three-dimensional object placed in the virtual space based on position information of a subject associated with the virtual viewpoint image of the second three-dimensional object.

16. An image processing method comprising:

acquiring a plurality of three-dimensional objects each including a virtual viewpoint image that is a virtual viewpoint image generated based on a plurality of images captured by a plurality of imaging apparatuses and is associated with one subject;

identifying a first three-dimensional object based on a user operation, among the plurality of three-dimensional objects;

identifying a second three-dimensional object different from the first three-dimensional object and including a virtual viewpoint image that includes the subject associated with the virtual viewpoint image of the first three-dimensional object within the virtual viewpoint image of the second three-dimensional object, which includes a subject associated with a virtual viewpoint image of the first three-dimensional object, the subject being included simultaneously with the subject of the first three-dimensional object within an imaging range of a same virtual camera corresponding to a virtual viewpoint image, among the plurality of three-dimensional objects; and generating a display image including the first three-dimensional object and the second three-dimensional object.

17. A non-transitory computer-readable storage medium storing computer-executable instructions that, when executed by a computer, cause the computer to perform an image processing method, the image processing method comprising:

acquiring a plurality of three-dimensional objects each including a virtual viewpoint image that is a virtual viewpoint image generated based on a plurality of images captured by a plurality of imaging apparatuses and is associated with one subject;

identifying a first three-dimensional object based on a user operation, among the plurality of three-dimensional objects;

identifying a second three-dimensional object different from the first three-dimensional object and including a virtual viewpoint image that includes the subject associated with the virtual viewpoint image of the first three-dimensional object within the virtual viewpoint image of the second three-dimensional object, which includes a subject associated with a virtual viewpoint image of the first three-dimensional object, the subject being included simultaneously with the subject of the first three-dimensional object within an imaging range of a same virtual camera corresponding to a virtual viewpoint image, among the plurality of three-dimensional objects; and generating a display image including the first three-dimensional object and the second three-dimensional object.

* * * * *